March 17, 1959 F. D. WERNER ET AL 2,878,055
NOISE REDUCING DEVICE FOR VEHICLE WINDOWS
Filed March 28, 1956
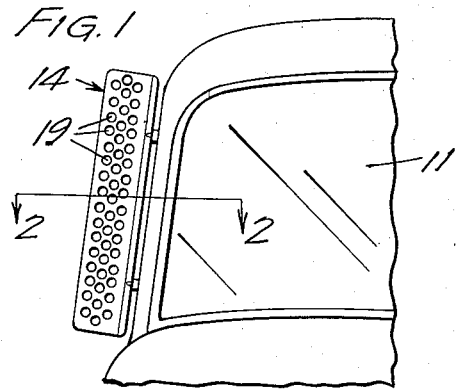
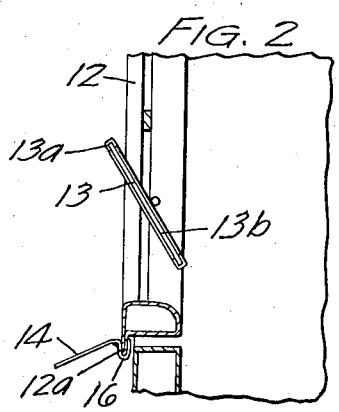
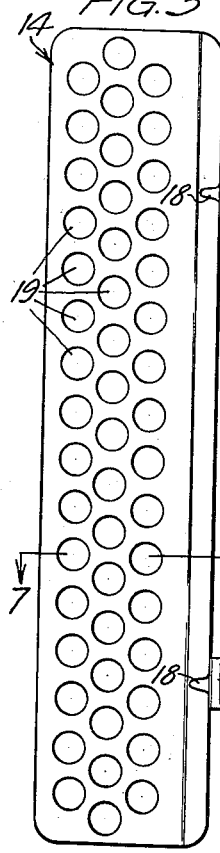
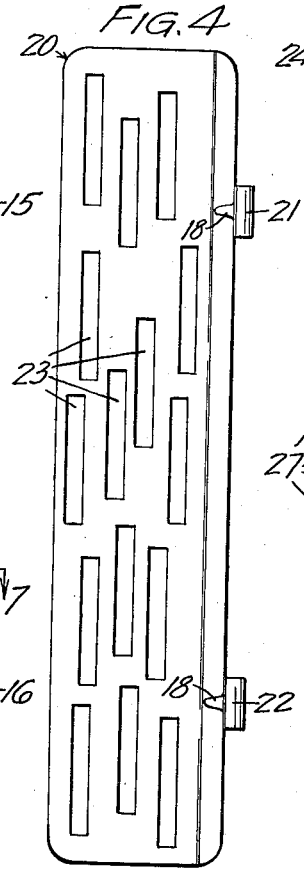
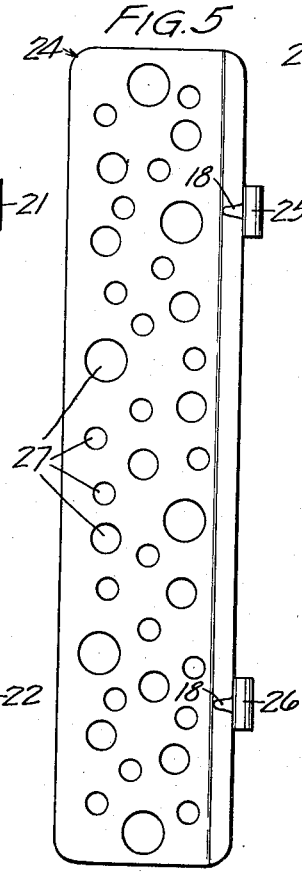
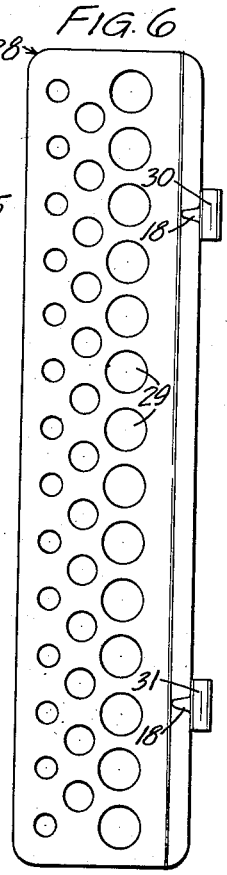
INVENTORS
FRANK D. WERNER
BERNARD M. LEADON
BY Williamson, Schroeder, Adams & Meyers
ATTORNEYS

United States Patent Office 2,878,055
Patented Mar. 17, 1959

2,878,055

NOISE REDUCING DEVICE FOR VEHICLE WINDOWS

Frank D. Werner and Bernard M. Leadon, Rosemount, Minn.

Application March 28, 1956, Serial No. 574,459

9 Claims. (Cl. 296—44)

This invention relates to devices for substantially reducing the amount of noise created by air flows impinging upon the outer surface of an open ventilator window of an automobile. More particularly it relates to a device for mounting upon an automobile immediately ahead of the ventilator window thereof so as to extend laterally outwardly from the automobile, the device being constructed to substantially reduce the noise created by the flow of air around the windshield of the automobile and against the outer surface of the ventilator window when the latter is partly opened.

In United States Letters Patent No. 2,685,470, Frank D. Werner, one of the applicants herein, pointed out that a very effective noise reducing device results when a plate member with increasingly larger apertures outwardly is secured to an automobile rain gutter beside the windshield so as to extend laterally thereof. The particular effectiveness of this device depends upon the gradual change in the velocity gradient of the air moving past the automobile as a result of the particular construction of the device. We have found, however, that apart from inducing a gradual velocity gradient outwardly from the automobile as disclosed and claimed in said patent, a reasonably effective reduction in the noise normally produced by air striking a partly open ventilator window can be otherwise accomplished.

We have found that when air strikes a surface such as the exterior surface of an automobile ventilator window, the noise which is thereby caused increases rapidly as the velocity of such air flow increases. As a result we have devised a noise reducing device which, rather than creating a gradual velocity gradient, merely reduces the overall velocity of the air permitted to impinge against the outer surface of the open ventilator window with a consequent sharp reduction in the amount of noise created. We have found we can accomplish this by utilizing a plate extending laterally from the automobile ahead of the ventilator window, the plate having apertures therein of a size other than increasing gradually outwardly. For example, we have found that a substantial reduction in noise can be accomplished through the use of a plate having equally sized apertures therethrough and also with randomly sized and arranged apertures therethrough.

It is a primary object of our invention to provide a novel device which will substantially reduce the amount of noise created by the flow of air impinging against the outer surface of an open ventilator window when mounted on the automobile directly ahead of the window.

Another object of the invention is to provide a novel device of the class described above which is both simple and inexpensive in construction.

Another object is to provide a novel device for reducing noise which will function on the principal that a relatively small reduction in the velocity of an air flow which impinges upon a surface results in a marked reduction in the volume of noise created by that air flow.

These and other objects and advantages of the invention will more fully appear from the following description made in connection with the accompanying drawings, wherein like reference characters refer to the same or similar parts throughout the several views, and in which:

Fig. 1 is a fragmentary front elevational view of an automobile with one embodiment of our invention mounted thereon.

Fig. 2 is a horizontal sectional view taken along line 2—2 of Fig. 1.

Fig. 3 is a front elevational view on an enlarged scale of the embodiment shown in Fig. 1.

Fig. 4 is a front elevational view on an enlarged scale of a second embodiment of the invention.

Fig. 5 is a front elevational view on an enlarged scale of a third embodiment of the invention.

Fig. 6 is a front elevational view on an enlarged scale of a fourth embodiment of the invention.

Fig. 7 is a sectional view taken along line 7—7 of Fig. 3.

One application of the present invention is related to high speed vehicles such as automobiles. A conventional automobile is indicated in the drawings in general by the numeral 10, which is provided with a windshield 11. The body portions of the automobile as shown include a front door 12 which has a conventional outwardly swingable ventilator window 13 mounted thereon. It will be noted that the rear portion 13a of the ventilator window swings outwardly from the outer surface of the door 12 and the outer surface 13b of this window is the surface which is normally impinged by an air flow rushing past the automobile. Our invention is adapted to be mounted upon the forward or leading edge of the door 12 which is designated as 12a.

One embodiment of our invention which is shown in Figs. 1–3 may include an elongated at least semi-rigid plate 14 which is adapted to be mounted in a longitudinal upright position upon the forward edge 12a of the door and extends outwardly and laterally therefrom in a forward direction as shown in Fig. 2. This plate 14 is preferably formed of a high grade metal such as stainless steel and is provided at one of its side edges with a pair of clamps 15 and 16 which are integral with the plate and braced by gussets such as 18. The clamps 15 and 16 are made so they will satisfactorily engage the leading edge 12a of the automobile so as to hold the plate member 14 in longitudinal upright position as shown in Figs. 1 and 7. If desired, a resilient pad may be inserted between the leading edge 12a and the clamps 15 and 16 or a small set screw may be utilized to positively secure the plate member 14 to the leading edge 12a and thereby insure against loss of the device. The clamps 15 and 16 may be separate parts riveted to the plate member 14.

The plate 14 is provided with a plurality of apertures 19. These apertures extend entirely through the cross section of the plate 14 and are all of equal diameter. It will be noted by reference to Fig. 3 that these apertures are substantially equally spaced and are arranged in definite vertical lines which are parallel to each other. It will be noted that these openings contrary to the arrangement shown of the openings in U.S. Letters Patent No. 2,685,470 are other than increasingly larger outwardly from the automobile. On the contrary these apertures are of the same size.

Fig. 4 illustrates a second embodiment of our invention. This embodiment includes a plate 20 which is elongated and at least semi-rigid similar to the plate 14. It also has a similar shape and carries a pair of clamp members 21 and 22 which are formed similarly to the clamps 15 and 16. The main difference in this embodiment is that the openings 23, although they are of equal size and similar shape, are randomly arranged and randomly spaced.

A third embodiment of our invention is shown in Fig. 5. This embodiment includes an elongated at least semi-rigid plate 24 which is constructed somewhat similarly to the plates 14 and 20 and which have a pair of clamps 25 and 26 similar in construction to the clamps 21 and 22. The primary difference between the plate 24 and the plates 14 and 20 is the arrangement, positioning and size of the apertures 27. It will be noted that the apertures which are formed through the plate 24 are of unequal size and are randomly spaced and arranged. It will be noted that they clearly do not increase outwardly in size from the automobile.

A fourth embodiment of our invention is shown in Fig. 6. This embodiment includes an elongated at least semi-rigid plate 28 which also has a plurality of apertures 29 formed therethrough. This plate 28 is also provided with a pair of clamps 30 and 31 adapted to engage the leading edge 12a of the door in order to secure the plate in elongated upright position ahead of the ventilator window 13 in the same manner in which the plates 14, 20 and 24 are secured to the automobile. In this embodiment, however, it will be noted that the apertures 29 are larger in size adjacent the automobile and decrease gradually outwardly away from the automobile. In other words, the outermost openings are smaller than the openings immediately adjacent thereto and inwardly thereof. These openings are spaced approximately equally taken longitudinally of the plate and are arranged along three parallel vertical lines.

In use the plate 14 is mounted upon the forward edge 12a of the door 12 as shown in Figs. 1 and 2. As the automobile moves down the road, the air flow which would normally strike the outer surface 13b of the open ventilator window 13 is engaged by the plate 14 and the air flow is interrupted thereby. By confining the air flow to passage through the apertures 19 we have found that the mean velocity of the air which strikes the outer surface 13b of the window 13 is substantially reduced and as a result the amount of noise created thereby is also substantially reduced. The reduction in noise is not directly proportional to the reduction in the velocity but is much greater than a direct proportion. As a result we have found that one can drive an automobile with a plate such as 14 mounted upon the forward edge of the door directly ahead of the ventilator window 13 with the latter open and the amount of noise which is created is not sufficient to be distracting. As pointed out above the cause for the reduction in the amount of noise is the reduction in the velocity of the air flow which strikes the outer surface of the ventilator window.

The embodiments of our invention shown in Figs. 4, 5 and 6 all function upon the same principal as the embodiments shown in Figs. 1–3. In other words, each of these plate members, when mounted as shown in Fig. 2, will substantially reduce the mean velocity of the air flow which strikes the outer surface 13b of the window 13 and thus a very substantially reduction in volume of noise is effected.

Thus it can be seen that we have provided a novel device which will substantially reduce the amount of noise created by the flow of air impinging against the outer surface of an open ventilator window on an automobile. This device is extremely simple and inexpensive to construct and is highly effective in reducing the undesirable noise. It will be noted that these plates function upon the principle that the velocity of the air flow which strikes the outer surface 13b of the window 13 is reduced and that even a slight reduction in the velocity of this air flow results in a marked reduction in the volume of noise created by the air flow.

It will, of course, be understood that various changes may be made in the form, details, arrangement, and proportions of the various parts without departure from the scope of our invention.

What is claimed is:

1. A device for reducing the noise normally caused by air flows impinging against the open ventilator window of an automobile, said device comprising an elongated, at least semi-rigid plate having portions thereof adapted to be secured in longitudinal upright position to the body of the automobile ahead of such an open ventilator window to extend laterally of the automobile and forwardly of its point of securement, said plate having a plurality of randomly spaced apertures formed therethrough, and means for securing said elongated plate in such position.

2. A device for reducing the noise normally caused by air flows striking the open ventilator window of an automobile, said device comprising an elongated, at least semi-rigid body having portions thereof adapted to be secured in longitudinal upright position to the body of the automobile ahead of such an open window to extend laterally thereof and having other portions extending outwardly and forwardly of said first mentioned portions, said body having a plurality of equally sized apertures formed therethrough, some of said apertures being disposed outwardly of the others, and means for securing said elongated body in such position.

3. A device for reducing the noise normally caused by air flows striking the open ventilator window of an automobile, said device comprising an elongated, at least semi-rigid plate having portions thereof adapted to be secured in longitudinal upright position to the body of the automobile ahead of an open ventilator window of the automobile and having other portions thereof extending outwardly and laterally and forwardly from said first mentioned portions and relative to the window of the automobile when said plate is so mounted, said laterally extending portions having a plurality of randomly arranged apertures of equal size formed therethrough, and means for securing said plate to the automobile in such position.

4. A device for reducing the noise normally caused by air flows striking the open ventilator window of an automobile, said device comprising an elongated, at least semi-rigid plate having portions thereof adapted to be secured in longitudinal upright position to the body of the automobile ahead of such an open window to extend laterally of the automobile and forwardly of its point of securement, said plate having a plurality of randomly sized apertures formed therethrough, and means for securing said plate in such position.

5. A device for reducing the noise normally caused by air flows striking the open ventilator window of an automobile, said device comprising an elongated, at least semi-rigid plate having portions thereof adapted to be secured in longitudinal upright position to the body of the automobile ahead of such an open window and having other portions thereof extending outwardly and laterally and forwardly from said first mentioned portions and relative to the window of the automobile when said body is so mounted, said laterally extending portions having a plurality of apertures formed therethrough, said apertures being of unequal size and generally increasingly smaller outwardly from said first mentioned portions.

6. A device for reducing noise normally caused by air flows striking the open ventilator window of an automobile, said device comprising an elongated, at least semi-rigid plate having portions thereof adapted to be secured at longitudinal upright position to the body of the automobile ahead of such an open ventilator window and having other portions thereof extending outwardly and laterally and forwardly from said first mentioned portions and relative to the window of the automobile when said plate is so mounted, said laterally extending portions having a plurality of equally sized air passages formed therethrough and arranged in a predetermined relation, and means for securing said first mentioned portions to the automobile ahead of the open ventilator window.

7. A device for reducing the noise normally caused by an airflow striking the open ventilator window of an automobile, said device comprising an elongated, at least semi-rigid body having portions thereof adapted to be secured in longitudinal upright position to the body of the automobile ahead of such an open ventilator window and having other portions thereof extending outwardly and laterally and forwardly from said first mentioned portions and relative to the window of the automobile when said body is so mounted, said laterally extending portions having a plurality of randomly spaced apertures formed therethrough, and means for securing said elongated body in such position.

8. A device for reducing the noise normally caused by an air flow striking the open ventilator window of an automobile, said device comprising an elongated, at least semi-rigid body having portions thereof to be secured in longitudinal upright position to the body of the automobile ahead of such an open ventilator window and having other portions thereof extending outwardly and laterally and forwardly from said first mentioned portions and relative to the width of the automobile when said body is so mounted, said laterally extending portions having a plurality of randomly arranged apertures formed therethrough, and means for securing said elongated body in such position.

9. A device for reducing the noise normally caused by an air flow striking the open ventilator of an automobile, said device comprising an elongated, at least semi-rigid body having portions thereof adapted to be secured in longitudinal upright position to the body of the automobile ahead of such an open window to extend laterally thereof and forwardly of its point of securement, said body having a plurality of apertures formed therethrough, all of said apertures being of equal size, and means for securing said elongated body in such position.

References Cited in the file of this patent
UNITED STATES PATENTS 2,685,470   Werner _____ Aug. 3, 1954